(12) United States Patent
Brown et al.

(10) Patent No.: US 8,346,312 B2
(45) Date of Patent: *Jan. 1, 2013

(54) BATTERY AUTHORIZATION SERVER

(75) Inventors: Michael K. Brown, Fergus (CA); Ian Robertson, Waterloo (CA); Herbert A. Little, Waterloo (CA); Lyall Winger, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,423

(22) Filed: Jul. 25, 2011

(65) Prior Publication Data

US 2011/0281559 A1 Nov. 17, 2011

Related U.S. Application Data

(63) Continuation of application No. 12/390,121, filed on Feb. 20, 2009, now Pat. No. 8,014,831.

(60) Provisional application No. 61/092,021, filed on Aug. 26, 2008.

(51) Int. Cl.
 *H04M 1/00* (2006.01)
(52) U.S. Cl. ......... 455/572; 455/410; 455/411; 380/247
(58) Field of Classification Search ........................ None
See application file for complete search history.

(56) References Cited

U.S. PATENT DOCUMENTS

| | | | |
|---|---|---|---|
| 6,789,191 B1 | 9/2004 | Lapstun et al. | |
| 8,014,831 B2 * | 9/2011 | Brown et al. | 455/572 |
| 2003/0056121 A1 | 3/2003 | Kimoto et al. | |
| 2005/0001589 A1 | 1/2005 | Edington et al. | |
| 2006/0178170 A1 * | 8/2006 | Chung et al. | 455/572 |
| 2007/0024235 A1 | 2/2007 | Guthrie | |
| 2007/0123304 A1 | 5/2007 | Pattenden et al. | |
| 2007/0123316 A1 | 5/2007 | Little | |
| 2007/0147615 A1 | 6/2007 | Chou et al. | |
| 2007/0236169 A1 | 10/2007 | Purdy et al. | |
| 2008/0159534 A1 * | 7/2008 | Rager et al. | 380/247 |
| 2009/0278492 A1 | 11/2009 | Shimizu et al. | |
| 2009/0292918 A1 | 11/2009 | Mori et al. | |
| 2010/0069067 A1 | 3/2010 | Vanderveen | |

OTHER PUBLICATIONS

Chabot, Pedro, Extended European Search Report for EP 09153377.8, Jul. 20, 2009.
Chabot, Pedro, First Exam Report for EP 09153377.8, Mar. 10, 2010.
Chabot, Pedro, Second Exam Report for EP 09153377.8, Mar. 24, 2011.

* cited by examiner

*Primary Examiner* — Erika A Washington
(74) *Attorney, Agent, or Firm* — Integral Intellectual Property Inc.; Miriam Paton

(57) ABSTRACT

A mobile communication device is capable of communicating with a battery authorization server. Determining an authorization status of a smart battery currently powering the mobile communication device involves an initial authorization process and a subsequent authorization process. The initial authorization process is conducted between the mobile communication device and the smart battery. If the initial authorization process is successful, it is followed by a subsequent authorization process between the mobile communication device and the battery authorization server.

15 Claims, 10 Drawing Sheets

BATTERY AUTHORIZATION SERVER

CROSS-REFERENCE TO RELATED APPLICATIONS

This application is a continuation of U.S. patent application Ser. No. 12/390,121 filed Feb. 20, 2009, which issued on Sep. 6, 2011 as U.S. Pat. No. 8,014,831, and which in turn claims priority under 35 U.S.C. 119(e) from U.S. Provisional Patent Application No. 61/092,021, filed Aug. 26, 2008, both of which are incorporated by reference herein in their entirety.

BACKGROUND

Mobile devices can be powered by internal means, such as an internal battery pack. The internal battery pack is an assembly of one or more batteries and provides a certain charge capacity. Different battery packs have different charge capacities, different termination voltages, and different charging/discharging characteristics.

Use of an unauthorized or counterfeit battery pack with the mobile device could result in damage to the battery pack, the mobile device or both. A counterfeit battery pack may have the same external physical characteristics of authorized battery packs, which result in confusion for consumers. Some battery packs have been known to overheat, leak liquids, ignite, or explode, resulting in injuries to the users of the mobile devices. Similar problems may occur in authorized but faulty battery packs.

BRIEF DESCRIPTION OF THE DRAWINGS

Embodiments are illustrated by way of example and not limitation in the figures of the accompanying drawings, in which like reference numerals indicate corresponding, analogous or similar elements, and in which:

FIGS. 4-1 and 4-2 are simplified flowcharts of two exemplary methods of subsequent authorization of a smart battery for use with a mobile communication device;

FIGS. 5-1, 5-2 and 5-3 are simplified flowcharts of exemplary methods of determining an authorization status of a smart battery;

Figure 1:
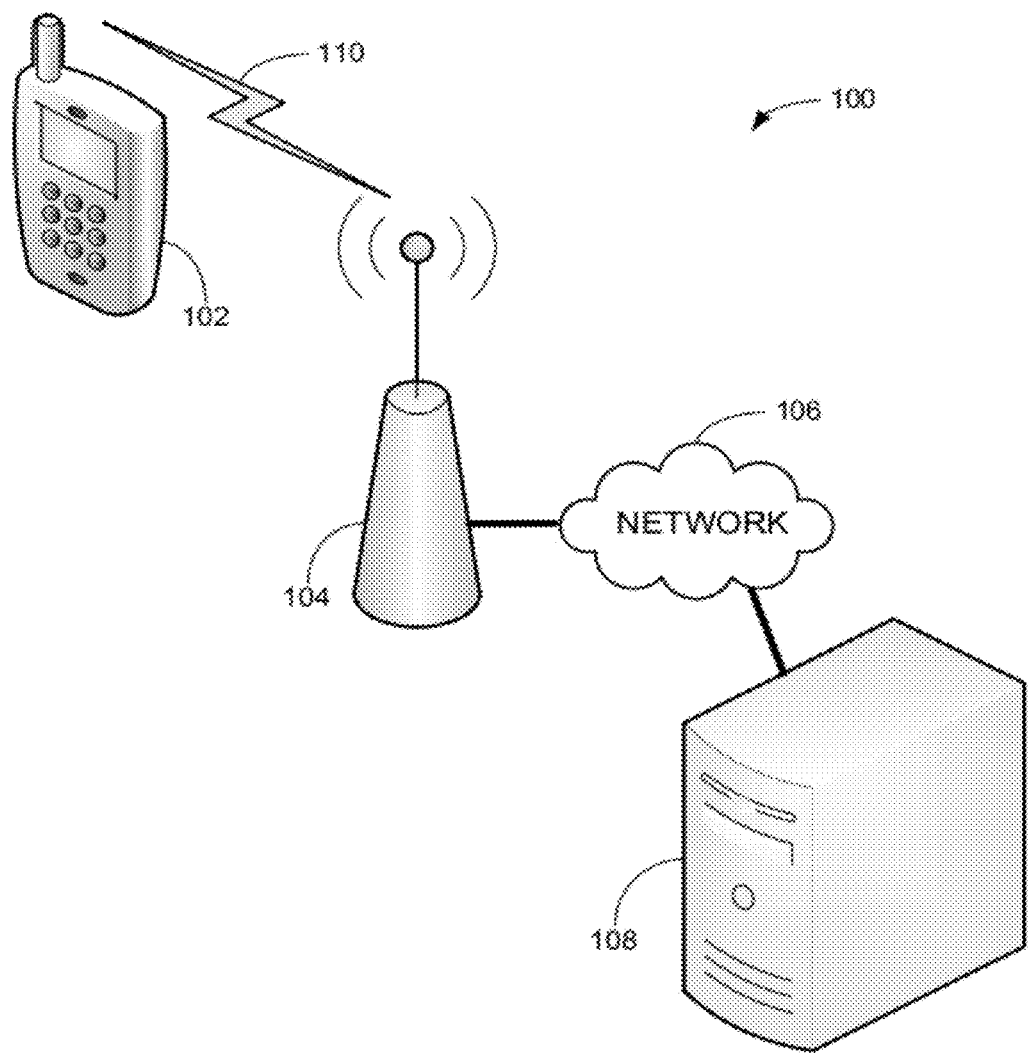
FIG. 1 is an illustration of an exemplary system comprising a mobile communication device, a transceiver station, a network and a battery authorization server.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A mobile communication device is capable of communicating with a battery authorization server. Determining an authorization status of a battery pack currently powering the mobile communication device involves an initial authorization process and a subsequent authorization process. The initial authorization process is conducted between the mobile communication device and the battery pack. If the initial authorization process is successful, it is followed by a subsequent authorization process between the mobile communication device and the battery authorization server.

A smart battery is a battery pack that includes a battery processor and other related circuitry to allow the smart battery to communicate with a device that it powers or with a battery charger. If the battery pack is not a smart battery, the initial authorization process between the mobile communication device and the battery pack will fail, and therefore all further references herein are to a smart battery.

During the initial authorization process between the mobile communication device and the smart battery, the mobile communication device receives an identifier of the smart battery. If the mobile communication device determines that the initial authorization process is successful, the mobile communication device and battery authorization server will proceed to conduct the subsequent authorization process, which involves the identifier of the smart battery.

The subsequent authorization process involves the battery authorization server using the identifier of the smart battery to look up data related to the smart battery and to generate an authorization status for the smart battery. The battery authorization server may maintain data related to smart batteries or may have access to such data maintained by another computer. The data may include, for example, one or a combination of the following lists: a list of identifiers of authorized smart batteries, a list of identifiers of unauthorized smart batteries, a list of identifiers of smart batteries subject to a recall, and a mapping of mobile communication device identities to smart battery identifiers. Although the term "list" is used herein, it is contemplated that the data may be maintained in a format other than a list.

During the subsequent authorization process, the mobile communication device receives from the battery authorization server a signed message that includes an authorization status of the smart battery. A non-exhaustive list of examples for the authorization status includes Valid, Counterfeit, Recall, and Duplicate. If the mobile communication device verifies the signed message as having been signed by the battery authorization server, then the mobile communication device acts according to the authorization status included in the signed message.

A notice corresponding to the authorization status may be included by the battery authorization server in the signed message. The mobile communication device, after having verified the signed message, may display the notice on a display screen of the mobile communication device.

The identifier of the smart battery may be a serial number or a lot number or any other suitable string of bits or digits or alphanumeric characters. The purpose of the identifier may be to uniquely identify the specific battery or may be to generally identify in which lot the specific battery was manufactured or the series to which the specific battery belongs. By then ensuring that a valid identifier is difficult for someone to create, counterfeiting can be made more difficult. For example, if an identifier can be represented with 128 bits, then the space of all possible identifiers is $2^{128}$ in size. Valid identifiers may be chosen at random from within that space. By virtue of that construction, it will be extremely difficult for someone to create an identifier at random, from a space of that size, that will match a valid identifier. It is not a requirement for the identifier to uniquely identify a particular smart battery. The exception is in the context of the discussion of cloned or duplicate smart batteries, where the ability to uniquely identify a smart battery is a requirement.

FIG. 1 is an illustration of an exemplary system 100 comprising a mobile communication device 102, a transceiver station 104, a network 106 and a battery authorization server 108.

Mobile communication device 102, hereinafter referred to as device 102, is a two-way communication device having the capability to communicate with other communication devices. Device 102 is powered by a smart battery (not shown). Device 102 may have the capability for voice communications or advanced data communications or both. Depending on the functionality provided by device 102 and the structure of device 102, it may be referred to as a data messaging device, a cellular telephone with data messaging capabilities, a smart phone, a wireless Internet appliance, a handheld wireless communication device (with or without telephony capability), a wirelessly enabled notebook computer, and the like.

Battery authorization server 108 is accessible via network 106, and device 102 is able to access network 106 via a wireless link 110 to transceiver station 104. Wireless link 110 represents one or more different radio frequency (RF) channels, operating according to defined protocols specified for communications with transceiver station 104. For example, transceiver station 104 is a head end of a wireless metropolitan area network (WMAN), and device 102 is capable of WMAN communications with the head end. In another example, transceiver station 104 is a base station of a wireless wide area network (WWAN), for example, a cellular telephone network, and device 102 is capable of WWAN communications with the base station. In yet another example, transceiver station 104 is a wireless local area network (WLAN) access point, and device 102 is capable of WLAN communications with the access point. In a further example, transceiver station 104 is a personal area network (PAN) device, and device 102 is capable of short-range wireless PAN communications, for example, Bluetooth® or ZigBee™, with the PAN device.

A non-exhaustive list of examples for the communications protocol used for communications between device 102 and battery authorization server 108 includes short-message-service (SMS), general packet radio service (GPRS), enhanced data rates for GSM evolution (EDGE), universal mobile telecommunications system (UMTS), wideband code division multiple access (W-CDMA), high-speed downlink packet access (HSDPA), integrated digital enhanced network (iDEN), evolution-data optimized (EvDO), and the like. New standards are still being defined, but it is believed that they will have similarities to the network behavior described herein, and it will be understood by persons of ordinary skill in the art that the implementations described herein can use any other suitable standards that are developed in the future.

Determining Authorization Status

Figure 2:
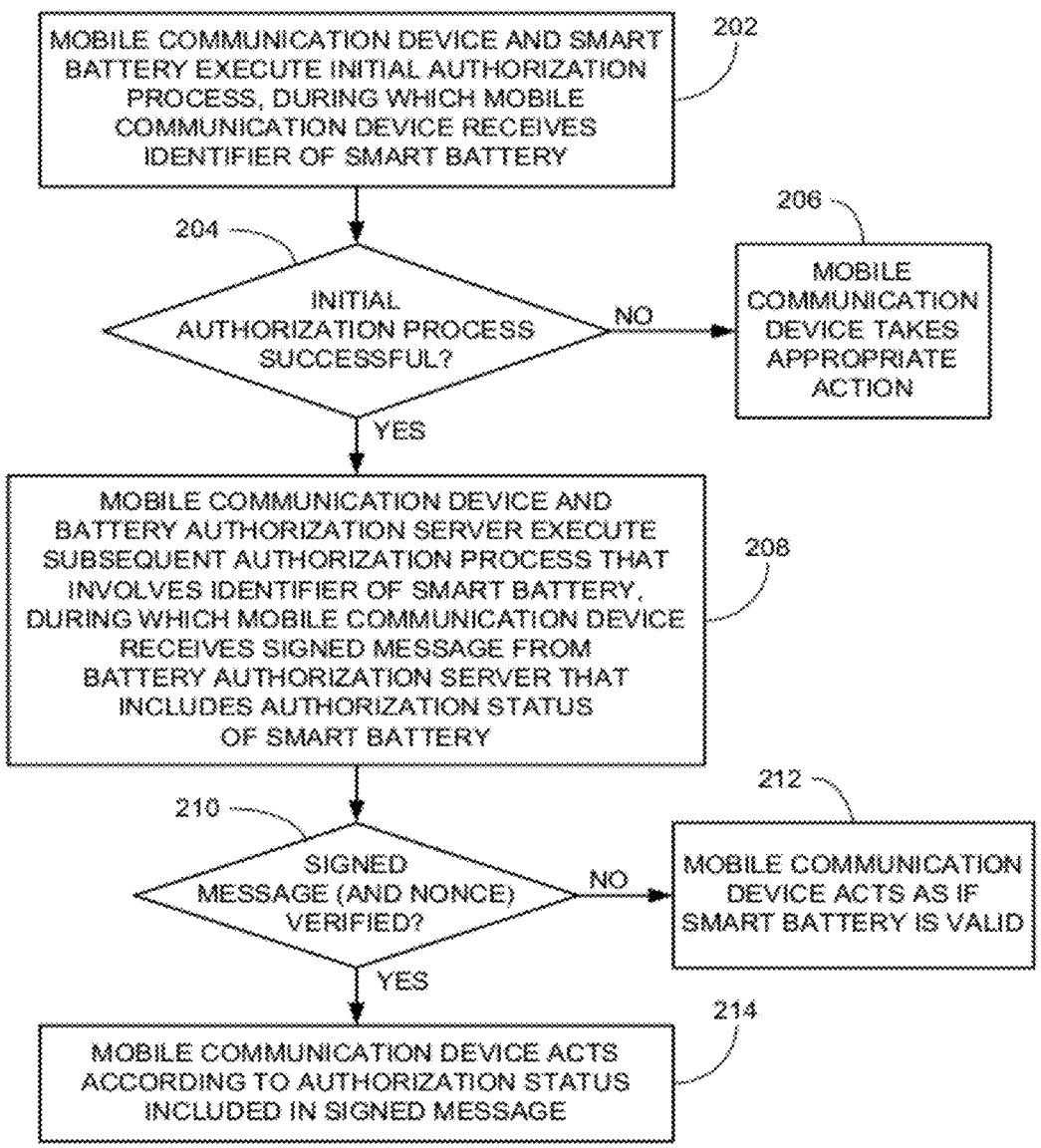
FIG. 2 is a simplified flowchart of an exemplary method for determining an authorization status of a smart battery for use with a mobile communication device.

FIG. 2 is a simplified flowchart of an exemplary method for determining an authorization status of a smart battery for use with a mobile communication device. This method may be implemented by device 102, the smart battery inserted in or otherwise coupled to device 102, and battery authorization server 108. The method may be initiated when device 102 resets. The method may be initiated when a smart battery is inserted into or otherwise coupled to device 102. Various implementations for detecting when a battery is removed from a device and for detecting that a battery is still inserted into a device are described in US Patent Publication No. 2007/0123316.

At 202, device 102 and the smart battery inserted in or otherwise coupled to device 102 conduct an initial authorization process, during which device 102 receives the identifier of the smart battery. An exemplary implementation of the initial authorization process is described in more detail hereinbelow with respect to FIG. 3.

If the initial authorization process has failed, as checked at 204, device 102 will take appropriate action at 206. For example, device 102 may prevent charging of the smart battery while coupled to device 102. In another example, device 102 may permit only charging at a very low charge rate (sometimes known as the "trickle charging" rate). In yet another example, device 102 may permit use of the smart battery at a reduced current rate, where components of device 102 having relatively high power consumption, such as a 3G wireless communication interface or a wireless local area network communication interface, are turned off. In a further example, device 102 may enter a standby mode of reduced power consumption until a new battery has been inserted or otherwise coupled to the device. A user of the device may be notified, for example, by display of a message or of an icon such as a battery icon with a line through it. For example, in the mode of reduced power consumption, all or a portion of the keyboard may be shut off, the screen may be turned off, any light emitting diodes (LEDs) may be turned off, and other components of device 102 may be turned off. The radio may or may not be turned off in this mode.

If the initial authorization process is successful, device 102 will initiate the subsequent authorization process with the battery authorization server. At 208, device 102 and battery authorization server 108 conduct a subsequent authorization process that involves the identifier of the smart battery. During the subsequent authorization process, device 102 receives a signed message from battery authorization server 108 that includes an authorization status of the smart battery. The signed message is digitally signed by battery authorization server 108 using a private key, K-PRIV-BAS. Device 102 stores a public key, K-PUB-BAS, corresponding to the private key of battery authorization server 108. Exemplary implementations of the subsequent authorization process are described in more detail hereinbelow with respect to FIGS. 4-1 and 4-2.

At 210, device 102 uses the public key to attempt to verify the signed message, which includes a digital signature. Only messages signed with a digital signature created using the private key that corresponds to the public key will be verified. If no signed message is received or if, as checked at 210, device 102 does not verify the signed message, the assumption may be that there is a communication error, and device 102 may act at 212 as if the smart battery has an authorization status of Valid. Alternatively, if no signed message is received or if, as checked at 210, device 102 does not verify the signed message, the assumption may be that something nefarious is occurring, and device 102 may act as if the smart battery has an authorization status of Counterfeit.

If, as checked at 210, device 102 verifies the signed message, device 102 acts according to the authorization status included in the signed message. More detail regarding authorization status values and their consequences are described hereinbelow.

Initial Authorization Process

Figure 3:
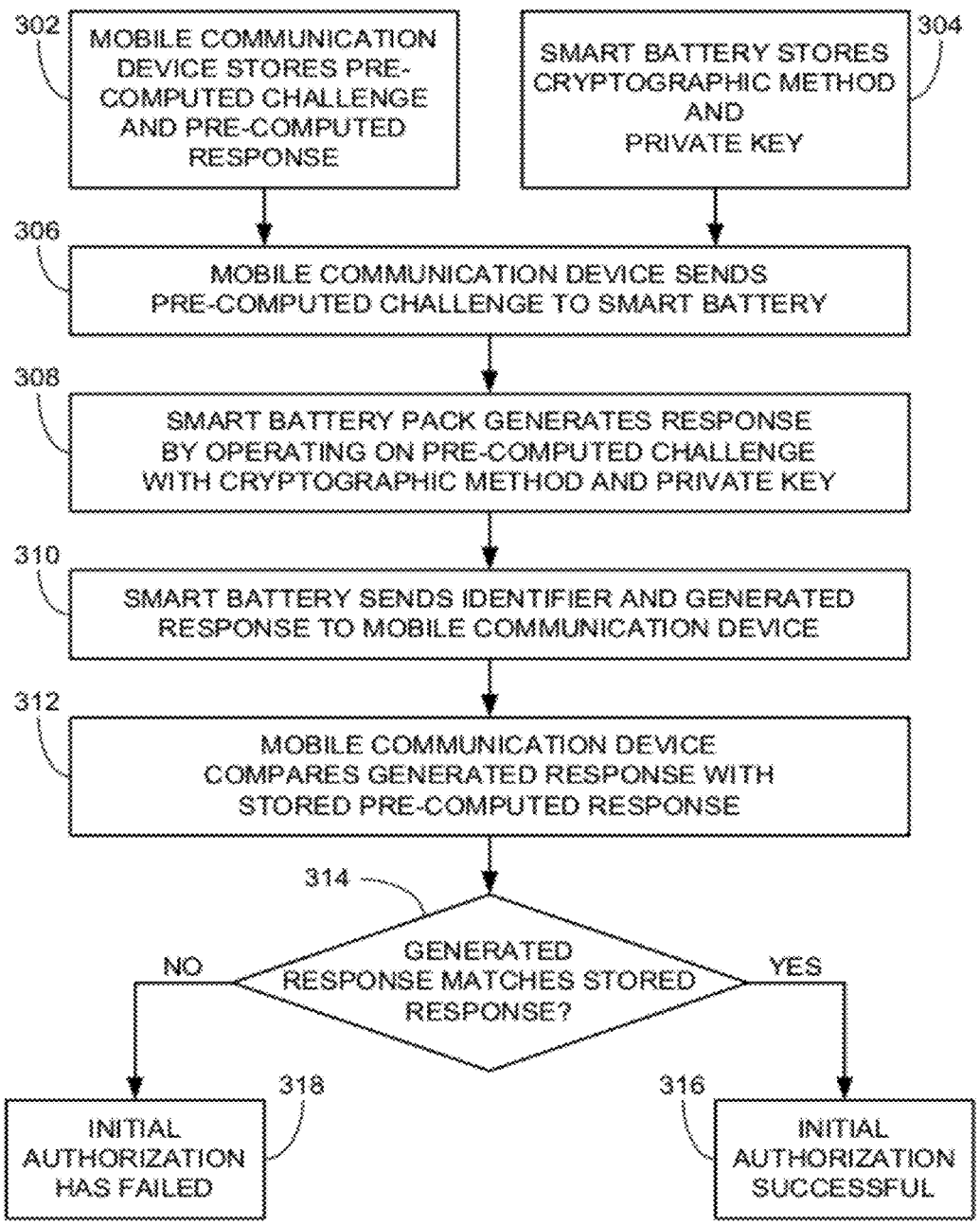
FIG. 3 is a simplified flowchart of an exemplary method of initial authorization of a smart battery for use with a mobile communication device.

FIG. 3 is a simplified flowchart of an exemplary method of initial authorization of a smart battery for use with a mobile communication device, for example, device 102. At 302, device 102 stores a challenge-response pair consisting of a pre-computed challenge and pre-computed response. The pre-computed response is obtained by operating on the pre-computed challenge with a particular cryptographic method and a private key, K-PRIV-BATT. The memory of the smart battery is considered more secure than the memory of the mobile communication device because smart batteries can be designed to protect information stored on the battery hardware. Consequently, in this implementation, at 304, the smart battery stores the cryptographic method and the private key, and the cryptographic method and the private key are not stored in the mobile communication device. The cryptographic method and the private key are therefore less likely to be compromised than if they were stored in the memory of the mobile communication device.

At 306, device 102 sends the pre-computed challenge, for example, a random number or a pseudo-random number, to the smart battery. At 308, the smart battery then generates a response by operating on the pre-computed challenge with the cryptographic method and the private key that are stored in the smart battery. At 310, the smart battery then sends the identifier of the smart battery and the generated response to device 102, which at 312 compares the generated response to the stored pre-computed response. If the generated response and the stored response match, as checked at 314, the initial authorization process is successful, as indicated at 316. If the generated response and the stored response do not match, as checked at 314, the initial authorization process has failed, as indicated at 318.

More generally, the mobile communication device stores a first portion of security information and a second portion of security information, and the smart battery stores a third portion of security information. The mobile communication device sends the first portion to the smart battery, which generates a response from the first portion and the third portion. The smart battery sends the identifier of the smart battery and the generated response to the mobile communication device, which compares the generated response to the second portion. The initial authorization process is successful if the generated response and the second portion match and has failed otherwise.

Subsequent Authorization Process

Figures 1, 4:
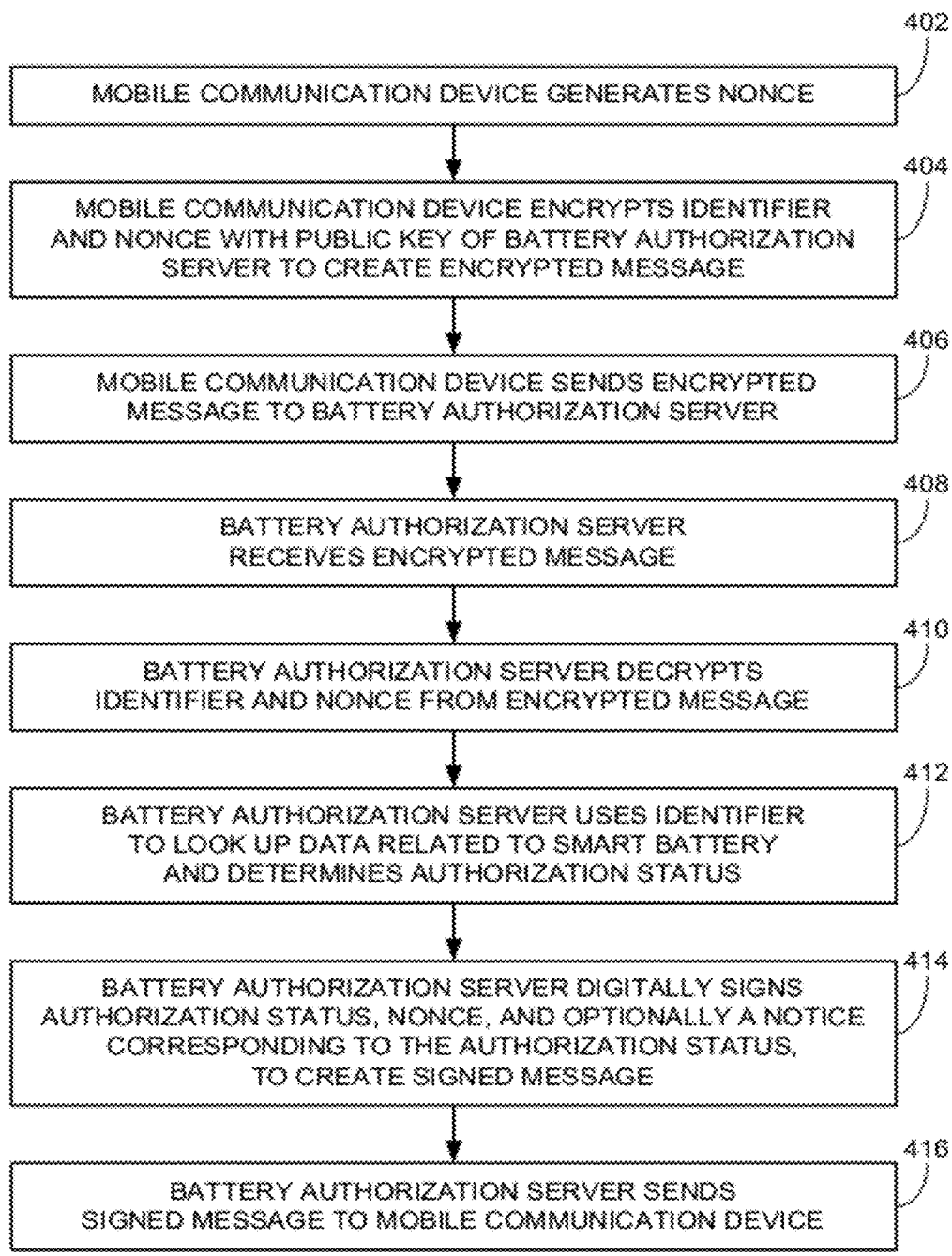
Figures 2, 4:
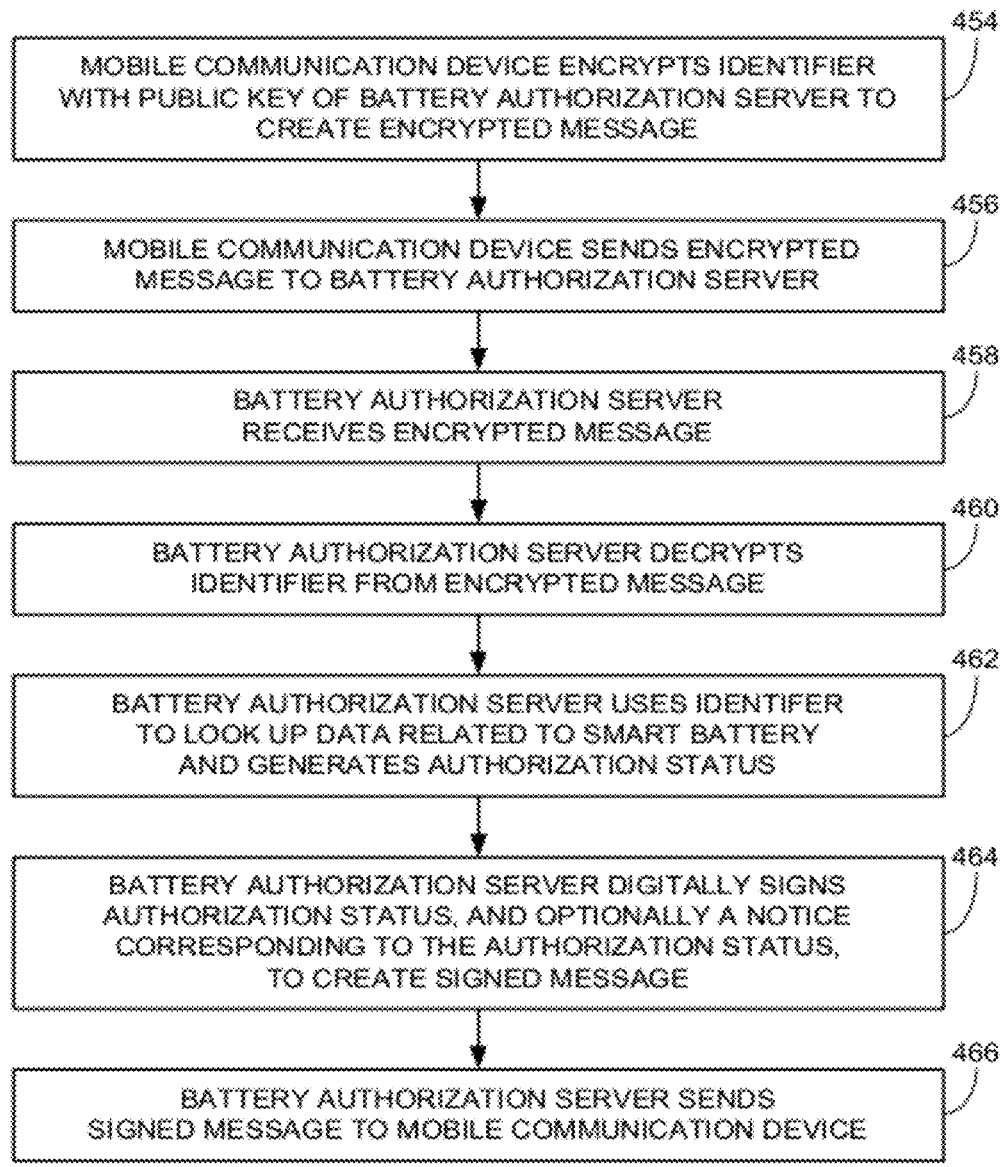

FIGS. 4-1 and 4-2 are simplified flowcharts of two exemplary methods of subsequent authorization of a smart battery for use with a mobile communication device. In FIG. 4-1, the subsequent authorization process begins at 402 with device 102 generating a nonce ("number used once"). The nonce may be a random or pseudo-random number. For example, the nonce may be generated with enough random bits to ensure a probabilistically insignificant chance of repeating a previously generated value. In another example, the nonce may include a timestamp in its value. In another example, each nonce generated may be of increased value than all the previously generated nonces.

At 404, device 102 then encrypts the identifier of the smart battery and the nonce with the public key, K-PUB-BAS, of battery authorization server 108 to create an encrypted message. At 406, device 102 then sends the encrypted message to battery authorization server 108. At 408, battery authorization server 108 receives the encrypted message. At 410, battery authorization server 108 uses its private key, K-PRIV-BAS, to decrypt the identifier and the nonce from the encrypted message. At 412, battery authorization server 108 then uses the identifier to look up data related to the smart battery and to determine an authorization status. At 414, battery authorization server 108 then uses its private key, K-PRIV-BAS, to digitally sign the authorization status and the nonce to create a signed message. As explained in more detail below, battery authorization server 108 may optionally include a notice corresponding to the authorization status in the signed message.

At 416, battery authorization server 416 then sends the signed message back to device 102. If device 102 verifies that the signed message was indeed signed by battery authorization server 108 and the nonce received in the signed message matches the generated nonce, this is "proof" for device 102 that the signed message originated at battery authorization server 108.

In FIG. 4-2, the subsequent authorization process begins at 454 with device 102 encrypting the identifier of the smart battery with the public key, K-PUB-BAS, of battery authorization server 108 to create an encrypted message. At 456, device 102 then sends the encrypted message to battery authorization server 108. At 458, battery authorization server 108 receives the encrypted message. At 460, battery authorization server 108 uses its private key, K-PRIV-BAS, to decrypt the identifier from the encrypted message. At 462, battery authorization server 108 then uses the identifier to look up data related to the smart battery and to determine an authorization status. At 464, battery authorization server 108 then uses its private key, K-PRIV-BAS, to digitally sign the authorization status to create a signed message. As explained in more detail below, battery authorization server 108 may optionally include a notice corresponding to the authorization status in the signed message.

At 466, battery authorization server 108 then sends the signed message back to the mobile communication device. If device 102 verifies that the signed message was indeed signed by battery authorization server 108, this is "proof" for device 102 that the signed message originated at battery authorization server 108.

In the foregoing description, the same private key—public key pair is used both for encryption/decryption of the message containing the battery identifier and for signing/verifying the message containing the authorization status. In alternative implementations, one private key—public key pair could be used for encryption/decryption of the message containing the battery identifier and a different private key—public key pair could be used for signing/verifying the message containing the authorization status.

Authorization Status

Figures 1, 5:
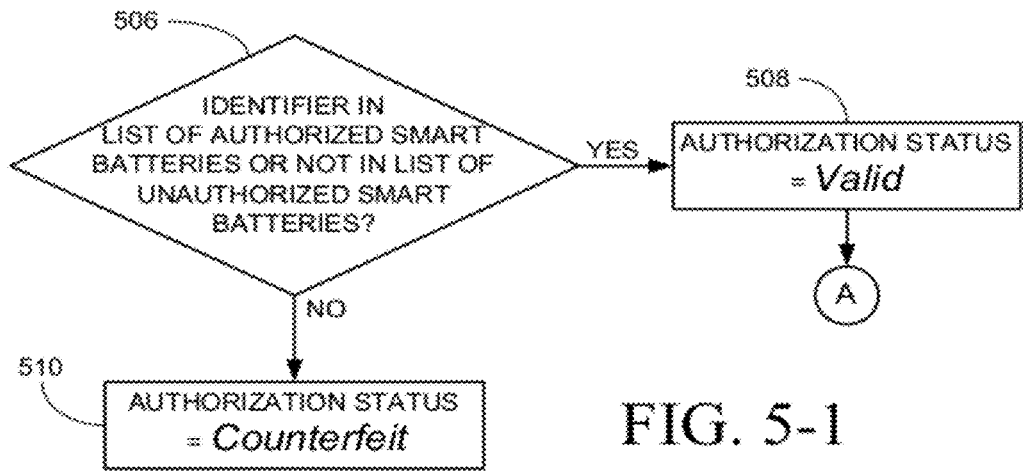
Figures 2, 5:
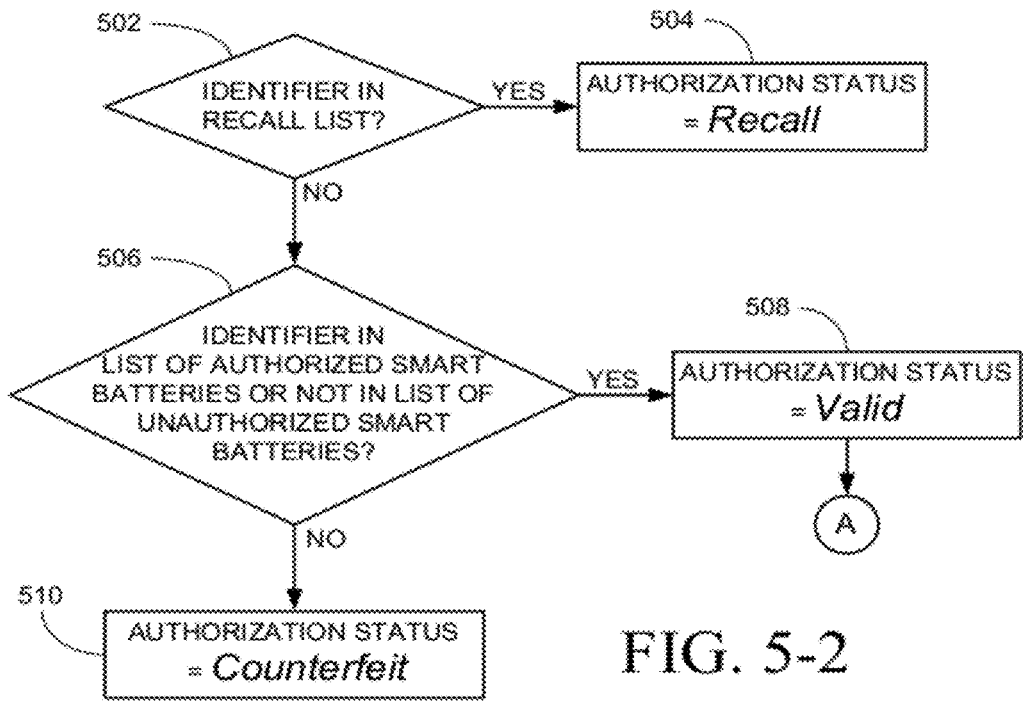
Figures 3, 5:
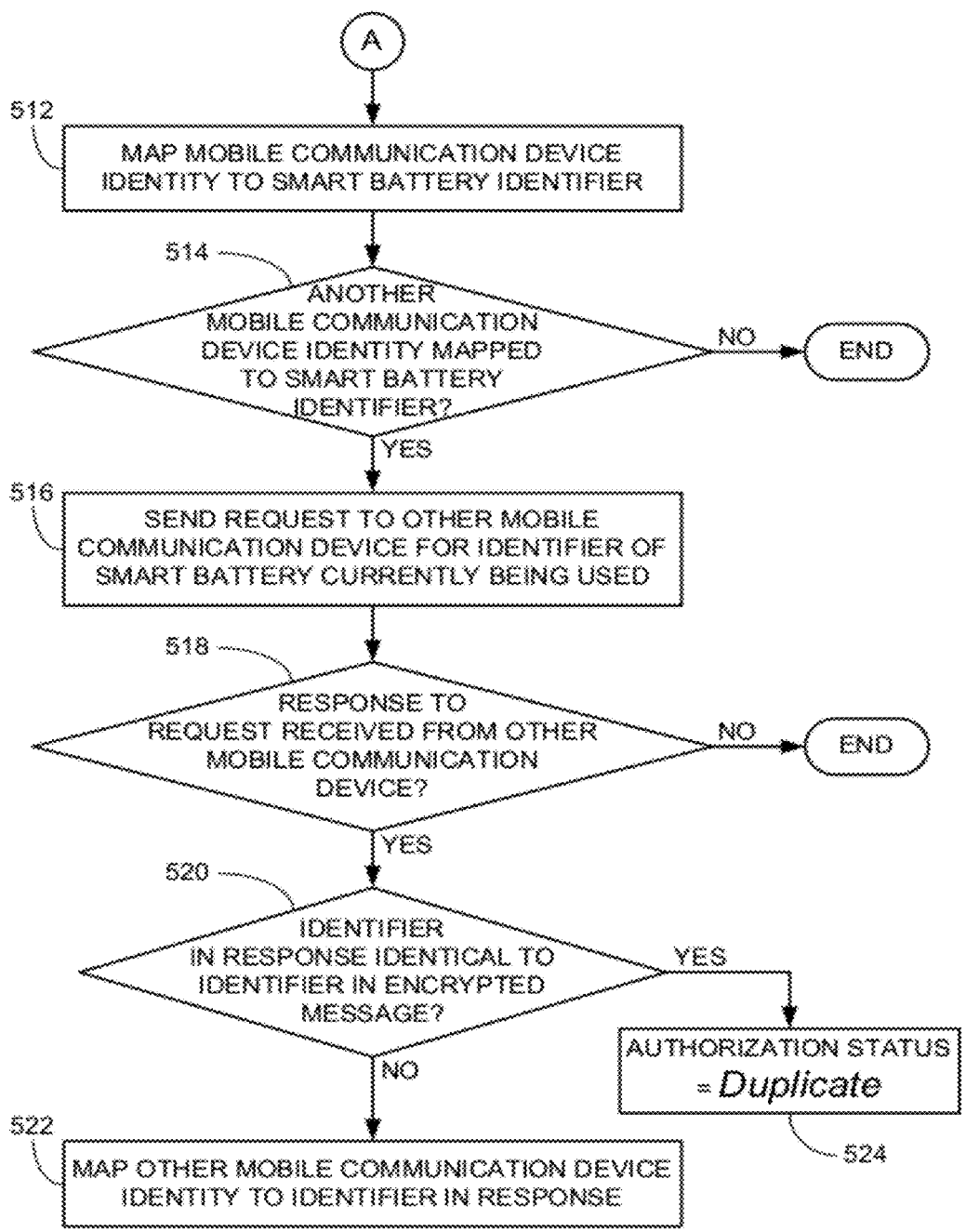

FIG. 5-1 is a simplified flowchart of an exemplary method of determining an authorization status of a smart battery, to be implemented in the battery authorization server. For example, the battery authorization server may maintain or have access to a list of identifiers of authorized smart batteries. Alternatively, or additionally, the battery authorization server may maintain or have access to a list of identifiers of unauthorized smart batteries. If the identifier received from the mobile communication device is in the list of authorized smart batteries or is not in the list of unauthorized smart batteries, as checked at 506, then the battery authorization server may determine at 508 that the authorization status is Valid. If the identifier received from the mobile communication device is not in the list of authorized smart batteries or is in the list of unauthorized smart batteries, as checked at 506, then the battery authorization server may determine at 510 that the authorization status is Counterfeit. By this method, the mobile communication device can be notified if the smart battery it is using is either unknown to the battery authorization server or has not been authorized. This information is helpful because a battery created to impersonate a valid smart battery would presumably be unknown or not authorized by the battery authorization server and hence would be recognized as Counterfeit by the mobile communication device.

FIG. 5-2 is a simplified flowchart of another exemplary method of determining an authorization status of a smart battery, to be implemented in the battery authorization server. The battery authorization server may maintain or have access to a list of identifiers of smart batteries that are subject to a recall. If the identifier received from the mobile communication device is in the recall list, as checked at 502, then the battery authorization server may determine at 504, that the authorization status is Recall. If the identifier received from the mobile communication device is not in the recall list, as checked at 502, then the method may proceed to 506 as described hereinabove with respect to FIG. 5-1. In an alternative embodiment, the test for recall status may occur after the authorization status has been determined to be Valid. As noted before, in order for a Recall check to be successful, it is not necessary to uniquely identify the smart battery. If the identifier is sufficiently granular to identify the lot or series to which the recall applies, then that will be enough information to properly identify whether this particular smart battery is the subject of the recall.

The mobile communication device can be uniquely identified, and the term "mobile communication device identity" is used herein to refer to the unique value associated with the mobile communication device. For example, an International Mobile Subscriber Identity (IMSI) is a unique number which is stored in a removable Subscriber Identity Module (SIM) card inserted into a GSM-compatible mobile communication device, stored in a Removable User Identity Module (R-UIM) inserted into a CDMA-compatible mobile communication device, and stored in a Universal Subscriber Identity Module (USIM) inserted into a UMTS-compatible communication device. Some CDMA-compatible mobile communication devices do not include an R-UIM and in such cases, the IMSI is stored directly in the mobile communication device. In another example, BlackBerry® devices from Research In Motion Limited of Waterloo, Ontario, Canada each have a unique Personal Identification Number (PIN) that is used to identify the device. In a further example, every GSM-compatible and UMTS-compatible mobile communication device is uniquely identified by its International Mobile Equipment Identity (IMEI), which is stored in the device itself. It is possible for the mobile communication device to have more than one unique identity, for example, a PIN and an IMSI, or a PIN and an IMSI and an IMEI.

When the battery authorization server receives a message from the mobile communication device, the battery authorization server is able to glean the mobile communication device's identity from the message. The battery authorization server may maintain or have access to a mapping of mobile communication device identities to smart battery identifiers. Records in the mapping may be of the form: (mobile communication device identity, smart battery identifier).

While a mobile communication device identity may be mapped to only one smart battery identifier, it is possible that more than one mobile communication device may be mapped to the same smart battery identifier. For example, a spare smart battery may be swapped between two or more mobile communication devices. However, it should not be possible for two users to simultaneously be using the same smart battery. If the battery authorization server detects such behavior, it means that at least one of the smart batteries is a clone and therefore unauthorized. Since the battery authorization server cannot distinguish between an authentic smart battery and its clone, the battery authorization server will determine the authorization status to be Duplicate.

FIG. 5-3 is a simplified flowchart of another exemplary method of determining an authorization status of a smart battery, to be implemented in the battery authorization server. The method illustrated in FIG. 5-3 may be followed after the authorization status has been determined to be Valid, as described hereinabove with respect to FIG. 5-1 and FIG. 5-2.

At 512, the battery authorization server maps the identity of the mobile communication device with which it is conducting the subsequent authorization process to the smart battery identifier, for example, by adding a record of the form (mobile communication device identity, smart battery identifier) to the mapping.

At 514, the battery authorization server checks the mapping to determine whether the smart battery identifier received from the mobile communication device is already mapped to the identity of another mobile communication device. If not, then the method ends.

If the smart battery identifier received from the mobile communication device is already mapped to the identity of another mobile communication device, then at 516, the battery authorization server sends a request to the other mobile communication device for the identifier of the smart battery currently being used by the other mobile communication device. If no response is received to the request, as checked at 518, then the method ends. For example, if the other mobile communication device is turned off or if the mobile communication device is out of radio coverage, then no response will be received.

If a response to the request is received by the battery authorization server, as checked at 518, then the battery authorization server checks at 520 whether the identifier in the response is identical to the identifier decrypted from the encrypted message received during the subsequent authorization process (e.g., at 408 of FIG. 4-1 or at 458 of FIG. 4-2).

If the identifiers are not identical, then the other mobile communication device is no longer using the smart battery to which it is mapped in the mapping, and at 522, the battery authorization server updates the mapping to map the identity of the other mobile communication device to the identifier in the response.

If the identifiers are identical, then at least two mobile communication devices are simultaneously using smart batteries having the same identifier, which means that at least one of the smart batteries is a clone and therefore unauthorized. Since the battery authorization server cannot distinguish between an authentic smart battery and its clone, the battery authorization server will determine at 524 that the authorization status is Duplicate.

The portion 514 through 522 of the method of FIG. 5-3 may be repeated for each other mobile communication device whose identity is mapped to the same smart battery identifier until all such other mobile communication devices have been checked or the authorization status is determined to be Duplicate, whichever occurs first.

A notice corresponding to the authorization status may optionally be included by the battery authorization server in the signed message. For example, a notice corresponding to the authorization status Recall may be "Please contact your Service Provider @ 1.888.123.4567 to replace battery.". In another example, a notice corresponding to the authorization status Counterfeit may be "This battery is unauthorized.

Please replace with an authorized battery.". In yet another example, a notice corresponding to the authorization status Duplicate may be "This battery is unauthorized. Please replace with an authorized battery.". The mobile communication device, after having verified the signed message and possibly checking that the nonce received from the battery authorization server is identical to the nonce sent by the mobile communication device to the authorization server, may display the notice on a display screen of the mobile communication device. Other methods for informing a user of the mobile communication device of the contents of the notice are also contemplated.

In addition to or as an alternative to informing the user of the mobile communication device of the contents of the notice, other actions may be taken by the mobile communication device according to the authorization status included in the signed message from the battery authorization server.

For example, if the authorization status is Counterfeit, the mobile communication device may prevent charging of the smart battery or may permit only charging at a very low charge rate (the "trickle charging" rate) or may enter a standby mode of reduced power consumption (described in more detail above) until a new battery has been inserted or otherwise coupled to the device.

In another example, if the authorization status is Duplicate, the mobile communication device may prevent charging of the smart battery or may permit only charging at a very low charge rate (the "trickle charging" rate) or may enter a standby mode of reduced power consumption (described in more detail above) until a new battery has been inserted or otherwise coupled to the device.

In a further example, if the authorization status is Recall, mobile communication device may prevent charging of the smart battery or may permit only charging at a very low charge rate (the "trickle charging" rate) or may enter a standby mode of reduced power consumption (described in more detail above) until a new battery has been inserted or otherwise coupled to the device.

It is contemplated that default behavior for the mobile communication device regarding the authorization status may be preprogrammed in the mobile communication device. It is also contemplated that the behavior of the mobile communication device regarding the authorization status may be configurable as part of an information technology (IT) policy within an organization. For example, an IT policy may prevent charging of a smart battery having the authorization status Counterfeit or Recall, and may permit only charging at a very low charge rate (the "trickle charging" rate) of a smart battery having the authorization status Duplicate.

By permitting charging at a very low charge rate, emergency calls may still be made from the mobile communication device.

Smart Battery

Figure 6:
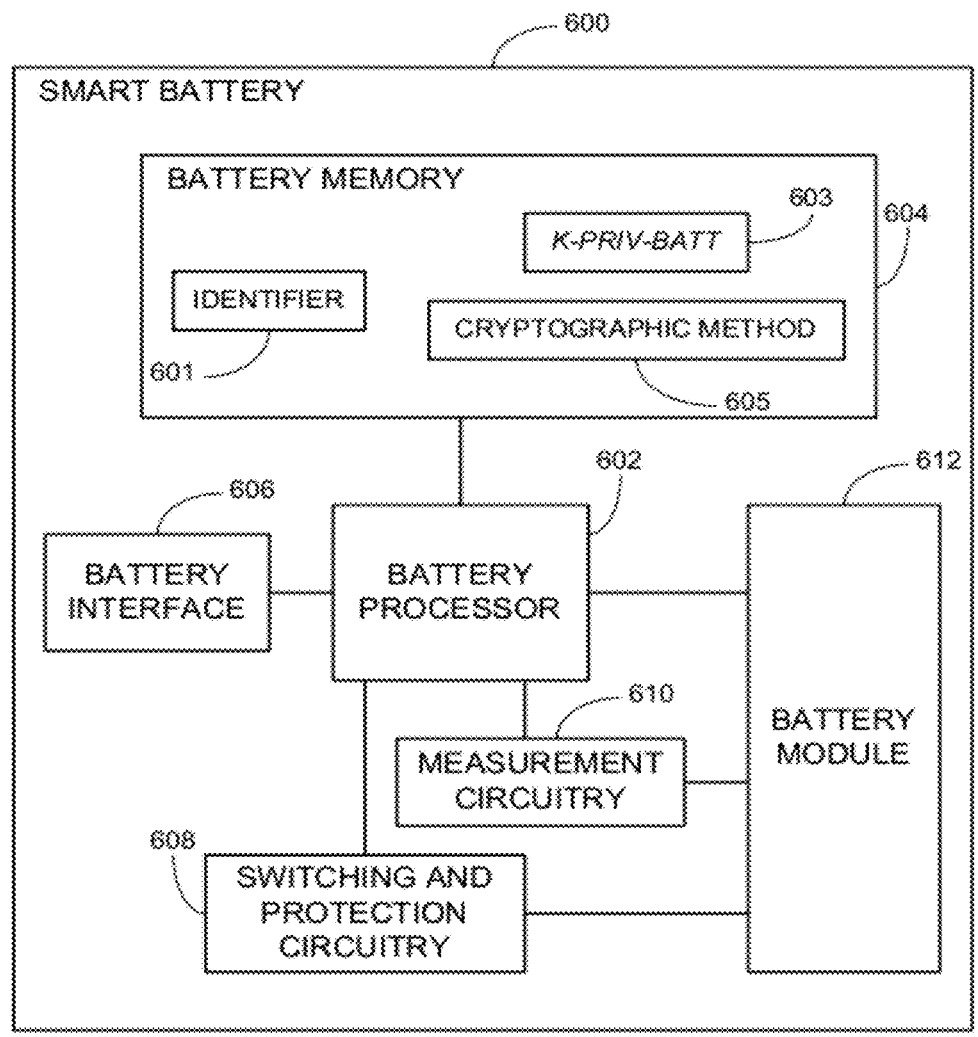
FIG. 6 is a simplified block diagram of an exemplary smart battery.

FIG. 6 is a simplified block diagram of an exemplary smart battery 600 that can be used to power a mobile communication device, for example, device 102. Smart battery 600 includes a battery processor 602, battery memory 604, a battery interface 606, switching and protection circuitry 608, measurement circuitry 610 and a battery module 612. Battery module 612 includes one or more batteries, which are generally rechargeable. The batteries can be made from nickel-cadmium, lithium-ion, or other suitable composite material and the like. In some implementations, battery processor 602 can be the PIC10F202 made by Microchip of Chandler, Ariz., USA. In these cases, a single General Purpose Input/Output (GPIO) pin on battery processor 602 can be connected to the processor of another device (for example, the main processor of a mobile communication device), to receive instructions from the processor of the other device and to provide data to the processor of the other device.

Battery processor 602 controls the operation of smart battery 600 and can communicate with the processor of another device via battery interface 606. Battery processor 602 may include registers, stacks, counters, a watchdog timer, and other components (all not shown) that are commonly used by a processor as is known by those skilled in the art. Battery processor 602 may also include a clock (not shown). Smart battery 600 may store information in battery memory 604. Information stored in battery memory 604 may include, for example, an identifier 601 of smart battery 600, and the third portion of security information as described hereinabove. In some implementations of the initial authorization process, the third portion of security information stored in battery memory 604 includes a private key 603 and a cryptographic method 605 used in the initial authorization process. Battery memory 604 may be a combination of volatile and non-volatile memory.

Measurement circuitry 610 may be used by smart battery 600 to read certain data related to the operation of battery module 612 such as battery current, battery voltage, battery temperature, and the like. These measurements can be used to obtain an accurate estimate of the amount of charge capacity remaining in battery module 612. To perform these measurements, measurement circuitry 610 includes an analog-to-digital converter (ADC) (not shown). Measurement circuitry 610 is optional, since in alternative embodiments, the mobile communication device can include circuitry for performing the functionality of measurement circuitry 610.

Switching and protection circuitry 608 may be used to protect smart battery 600. Switching and protection circuitry 608 can act like a circuit breaker and can be activated by battery processor 602 or the processor of another device (for example, the main processor of a mobile communication device) under certain situations to ensure that smart battery 600 is not damaged in use. For instance, switching and protection circuitry 608 may include a thermal breaker to disable smart battery 600 when the temperature of battery module 612 is too high. The thermal breaker can also disconnect smart battery 130 under high current loads if other protection circuitry fails. Switching and protection circuitry 608 can also protect against short circuits, under voltage conditions, over voltage charging, reverse polarity being applied to smart battery 600, etc. Accordingly, switching and protection circuitry 608 can also be used during the charging, discharging or pre-charging of battery module 612 as well as for battery cell balancing. Additional protection circuitry may be included in battery interface 606.

Battery module 612 provides the supply power to battery processor 602, which then provides the supply power to the processor of another device (for example, the main processor of a mobile communication device) via battery interface 606, using connections commonly known by those skilled in the art, such as via a system power bus. Battery interface 606 is optional if the other device (for example, the mobile communication device) includes a battery interface which can provide the same functionality as battery interface 606.

Exemplary embodiments of battery interface 606 are described in US Patent Publication No. 2007/0123316. Also described in US Patent Publication No. 2007/0123316 are exemplary embodiments of a battery communication protocol used for battery processor 602 to communicate with the processor of another device (for example, the main processor of a mobile communication device). The battery communication protocol described in US Patent Publication No. 2007/0123316 may be used for the initial authentication process described hereinabove.

Mobile Communication Device

Figure 7:
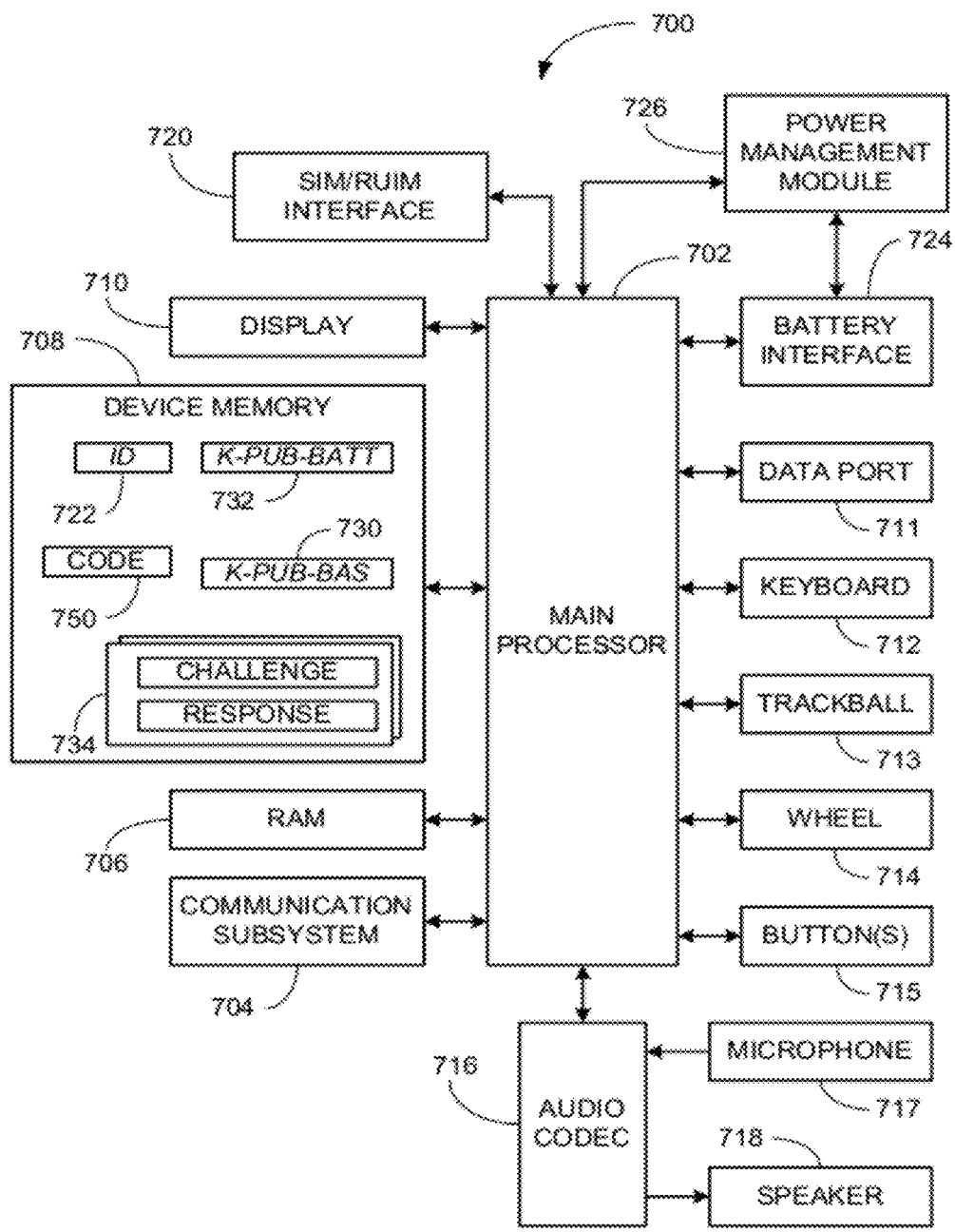
FIG. 7 is a simplified block diagram of an exemplary mobile communication device.

FIG. 7 is a simplified block diagram of an exemplary mobile communication device 700. Device 700 is an example of device 102. A main processor 702 controls the overall operation of device 700. Communication functions, including data communications, voice communications or both, are performed through a communication subsystem 704. Communication subsystem 704 enables device 700 to communicate over a wireless link with a transceiver station, for example, transceiver station 104.

Main processor 702 also interacts with additional subsystems such as a Random Access Memory (RAM) 706, a device memory 708, a display 710, a data port 711, a keyboard 712, a trackball 713, a wheel 714, and one or more buttons 715. Main processor 702 also interacts with an audio coder-decoder (codec) 716 coupled to a microphone 717 and a speaker 718. Other device subsystems (not shown) are also contemplated.

Device 700 may require a SIM/RUIM card (not shown) to be inserted into a SIM/RUIM interface 720 that interacts with main processor 702. As mentioned above, a unique identity of device 700 may be stored in the SIM/RUIM card. Additionally or alternatively, a unique identity 722 of device 700 may be programmed into device memory 708.

Device 700 is a battery-powered device and may include a battery interface 724 for interfacing with smart battery 600. In this case, battery interface 724 is also coupled to a power management module 726, which assists smart battery 600 in providing power to device 700. Main processor 702 can also be coupled to power management module 726 for sharing information. However, in alternative implementations, battery interface 724 can be provided by smart battery 600.

Main processor 702, in addition to its operating system functions, enables execution of software applications (not shown) on device 700. The subset of software applications that control basic device operations, including data communications, voice communications or both, will normally be installed on device 700 during its manufacture. The software applications may include an email program, a web browser, an instant messaging program, an attachment viewer, and the like.

Data port 711 may be any suitable port that enables data communication between device 700 and another computing device. Data port 711 may be a serial port or a parallel port. In some instances, data port 711 may be a universal serial bus (USB) port that includes data lines for data transfer and a supply line that can provide a charging current to charge device 700.

Device memory 708 may store one or more public keys 730 of the battery authorization server, for use during the subsequent authorization process. Device memory 708 may store a public key 732 of a smart battery, for use during the initial authorization process. Device memory 708 may also store a first portion of security information and a second portion of security information, for use during the initial authorization process as described hereinabove. In some implementations of the initial authorization process, the first portion of security information and the second portion of security information comprise a pre-computed challenge and a corresponding pre-computed response. One or more pre-computed challenge-response pairs 734 may be stored in device memory 708. As described in US Patent Publication No. 2007/0123316, a manufacturing process may be employed in which smart batteries and mobile communication devices are paired up. For each pair, several unique challenge and response pairs are generated based on a private key and a cryptographic algorithm. The challenge and response pairs are stored on the mobile communication devices and the corresponding private key and the cryptographic algorithm are stored on the corresponding smart batteries.

Device memory 708 may store code 750 which, when executed by main processor 702, enables device 700 to implement its portions of the methods described hereinabove.

Battery Authorization Server

Figure 8:
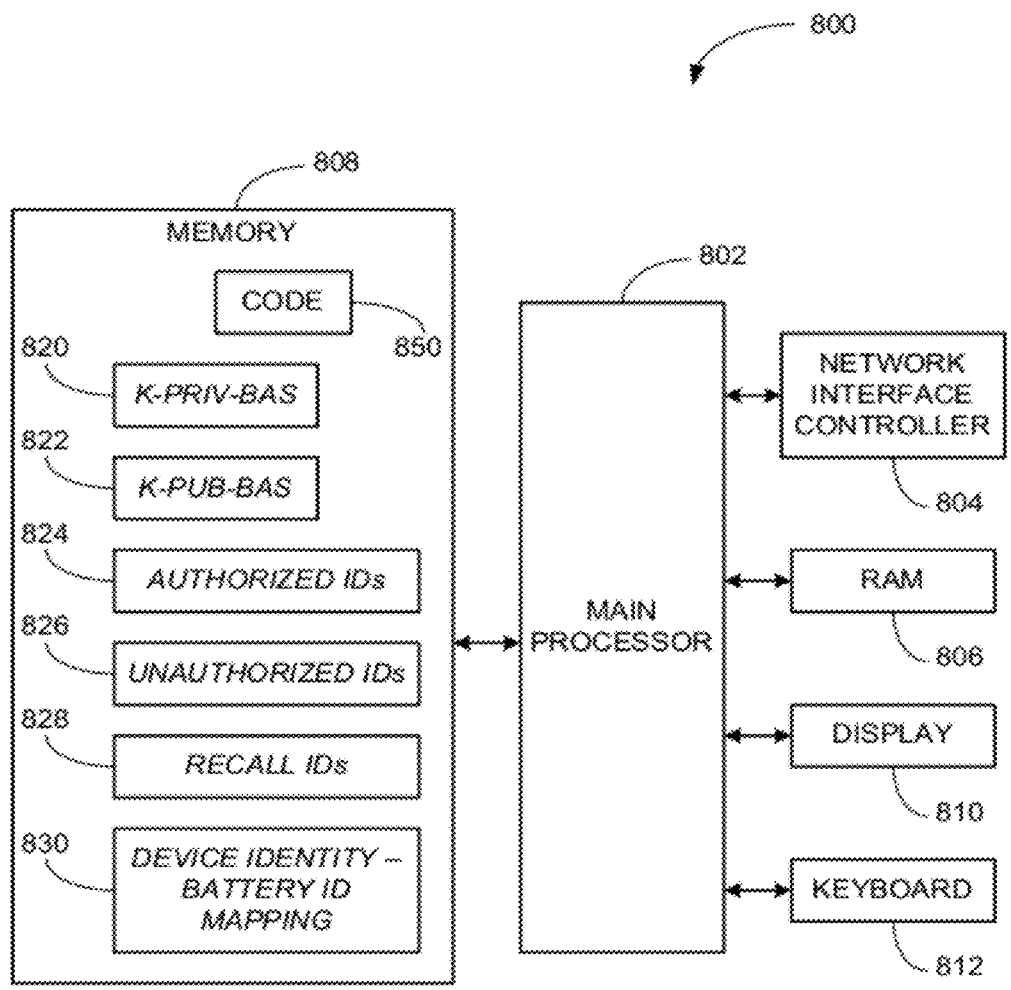
FIG. 8 is a simplified block diagram of an exemplary battery authorization server.

FIG. 8 is a simplified block diagram of an exemplary battery authorization server 800. Server 800 is an example of battery authorization server 108. A main processor 802 controls the overall operation of server 800. A network interface controller 804 coupled to main processor 802 enables server 800 to communicate with a network, for example, network 106.

Main processor 802 also interacts with additional subsystems such as a Random Access Memory (RAM) 806, and a memory 808. Optionally, server 800 includes a display 810, and a keyboard 812, both coupled to main processor 802. Other subsystems (not shown) are also contemplated.

Memory 808 may store one or more private keys 820 of the battery authorization server, for use during the subsequent authorization process. Memory 808 may store one or more public keys 822 corresponding to the private keys 820.

As described hereinabove with respect to FIGS. 5-1, 5-2 and 5-3, memory 808 may store a list 824 of identifiers of authorized smart batteries. Additionally, or alternatively, memory 808 may store a list 826 of identifiers of unauthorized smart batteries. Optionally, memory 808 may store a list 828 of identifiers of smart batteries subject to a recall. Optionally, memory 808 may store a mapping 830 of mobile communication device identities to smart battery identifiers.

As described hereinabove, any of list 824, list 826, list 828 and mapping 830 may be stored not in server 800 but in another computing device that is accessible by server 800.

Memory 808 may store code 850 which, when executed by main processor 802, enables server 800 to implement its portions of the methods described hereinabove.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A battery authorization server for authorizing a smart battery of a mobile communication device, the server comprising:
   a processor;
   a network interface controller coupled to the processor; and
   a memory coupled to the processor,
   wherein the memory is to store data related to smart batteries and is to store code which, when executed by the processor, uses an identifier of the smart battery to look up data related to the smart battery and to determine an authorization status of the smart battery,
   such that the battery authorization server is able to handle and to respond to battery authorization status requests received via the network interface controller.

2. The battery authorization server of claim 1, wherein the data comprise a list of identifiers of authorized smart batteries.

3. The battery authorization server of claim 2, wherein the identifier of the smart battery belongs to the list of identifiers of authorized smart batteries, and the authorization status indicates that the smart battery is valid.

4. The battery authorization server of claim 2, wherein the identifier of the smart battery does not belong to the list of identifiers of authorized smart batteries, and the authorization status indicates that the smart battery is counterfeit.

5. The battery authorization server of claim 1, wherein the data comprise a list of identifiers of unauthorized smart batteries.

6. The battery authorization server of claim 5, wherein the identifier of the smart battery does not belong to the list of identifiers of unauthorized smart batteries, and the authorization status indicates that the smart battery is valid.

7. The battery authorization server of claim 5, wherein the identifier of the smart battery belongs to the list of identifiers of unauthorized smart batteries, and the authorization status indicates that the smart battery is counterfeit.

8. The battery authorization server of claim 1, wherein the data comprise a list of identifiers of smart batteries subject to recall.

9. The battery authorization server of claim 8, wherein the identifier of the smart battery belongs to the list of identifiers of smart batteries subject to recall, and the authorization status indicates that the smart battery is subject to recall.

10. The battery authorization server of claim 1, wherein the data comprise a mapping of mobile communication device identities to identifiers of smart batteries.

11. The battery authorization server of claim 10, wherein, due to the identifier of the smart battery being mapped simultaneously to more than one mobile communication device identity, the authorization status indicates that the smart battery is duplicate.

12. The battery authorization server of claim 1, wherein the authorization status indicates that the smart battery is valid.

13. The battery authorization server of claim 1, wherein the authorization status indicates that the smart battery is counterfeit.

14. The battery authorization server of claim 1, wherein the authorization status indicates that the smart battery is subject to recall.

15. The battery authorization server of claim 1, wherein the authorization status indicates that the smart battery is duplicate.

* * * * *